Patented July 6, 1926.

1,591,454

UNITED STATES PATENT OFFICE.

GEORGE A. HENDERSON, OF ST. ALBANS, WEST VIRGINIA.

VULCANIZED MATERIAL AND PROCESS FOR MAKING THE SAME.

No Drawing. Application filed January 10, 1922, Serial No. 528,292. Renewed May 8, 1926.

My invention relates to the vulcanization of rubber, bitumens and the like, by sulfur in the presence of heat, and its object is to accomplish vulcanization of the vulcanizable material in one operation more quickly and more economically than has been possible by other means known to the prior art.

In carrying out my process I take asphaltic base petroleum residuum, coal tar pitch, caoutchouc, para-rubber, or scrapped old rubber in combination with fibers, mineral dust or otherwise compounded, or I may take a mixture of them all in various proportions, depending on the article of manufacture to be produced from their admixture, or I may use other vulcanizable materials, and I subject them to heat in a vat sufficient to raise the temperature of the mass to from 250 deg. Fahr. to 400 deg. Fahr. depending on the nature of the vulcanizable base selected for my purposes. In my experiments I have considered that water ($H_2O$) is more separable into its individual elements, hydrogen 2 and oxygen 1 by my herein described means, when in the form of steam, as distinguished from water; and that when in the presence of sulfur ($S_8$) fumes and in the presence of thin films of the vulcanizable material surrounding them, and forming a constantly cellular, honeycombed condition of the mass, hydrogen sulfid gas ($H_2S$) and sulfur dioxide gas ($SO_2$) are simultaneously formed in such cells from the sulfur ($S_8$) under the influence of heat, and that the interaction of the hydrogen and oxygen present in the steam, act on the vulcanizable material, even where air is not specifically injected into the mass during the operation. I have discovered that it is during this chemical reaction of the independent atoms of the molecules of my provided ingredients, in their nascent condition, viz, at the instant of their liberation, by the means herein provided, from their original substances, the atomic components of the gases, when liberated from their mother substances ($H_2O$ and $S_8$) either by extraction, by affinity of the liberated sulfur atoms and the hydrogen and oxygen atoms from their original substances, they enter into combination with the vulcanizable material and that instantaneous vulcanization of my product results fom whatever manner of interaction is influenced by the means above provided, whether or not that be due to the separation of hydrogen from $H_2O$ (in the form of steam) by the affinity of the sulfur atoms (8) from $S_8$) or to the extraction of hydrogen from the vulcanizable material itself, by reason of the superior affinity of the sulfur for that hydrogen atom, in example, the bitumen there present. In any event I have discovered that it is due to the interactions of the atoms occurring in the nascent period, at the instant of their separation from their specified ingredients, that affects instantaneous vulcanization of my material herein described, as distinguished from the prior preparation of the two gases and their application to the vulcanizable material either in sheet form or in solution and in practice I then inject into said vat in air or steam suspension simultaneously with pulverized sulfur, dry colloidal mineral dust and separated mineral (such as asbestos) and vegetable (such as wood pulp or beaten rag) fibers in a moist condition, and during mechanical agitation of the mass in the formative period of my vulcanized product, subject the same to sustained heat to completely dehydrate the same, and until homogeneity of the mass is secured.

In this connection I rely on the moisture above prescribed, in combination with the sulfur, when both are reduced to fumes and steam, respectively, by the heat sustained in the mass for the purpose, to (chemically) form hydrogen sulfid and sulfur dioxide gases, which interact in vulcanizing the vulcanizable ingredient of the mixture while acting physically to reduce the mass to a cellular, honeycombed condition during continuous agitation of the mass in the vat until completely dehydrated, for the purpose of exposing, to the interactions of the gases, thin films of the vulcanizable material for the purposes above prescribed.

In further carrying out my invention I cause pressure to be applied to the molten cellular mass within the vat by providing for its closure during the formative period of the product, and then subject the vat to the influence of suction, to cause a partial vacuo therein for the purpose of removing the residual gases and steam from the material and the vat, during constant agitation of the mass in its formative period; and have discovered that, in addition to the above mentioned physical and chemical conditions, there is also created, by the means herein prescribed, colloidal suspension of the aggregate as well as of the dust filler, within the vulcanizable material, acting, in the final product, as its continuous phase, separating and binding the aggregate particles, in accomplishment of my object as hereinabove prescribed.

Whereupon the mass is emitted from the vat and compressed into shape or otherwise used as cements, articles of manufacture, filler, paving, roofing, or other materials and products known to the art.

In further modification of my process I may inject into the mass, when in an anhydrous condition, before or after vulcanization of the same by the means hereinabove mentioned, chlorine gas, for the purpose of additional vulcanization and treatment of my product, and accelerators of vulcanization such as hexamythelene-tetramine, in furtherance of the object of my invention.

I claim:—

1. The process for the vulcanization of vulcanizable materials consisting in heating the same and thereinto injecting in steam suspension pulverized sulfur to form of the ingredients hydrogen sulfid and sulfur dioxide gases, then subjecting the mass to agitation under the influence of sustained heat, to form thereof a constantly changing cellular mass in honeycombed condition, thereby stretching the vulcanizable material, on thin films on which said gases act in their nascent condition, to vulcanize the material, substantially as described.

2. The process for the vulcanization of vulcanizable materials consisting in heating the same and therein injecting in steam and air suspension pulverized sulfur to form of the ingredients hydrogen sulfid and sulfur dioxide gases, then subjecting the mass to agitation under the influence of sustained heat, to form thereof a constantly changing cellular mass in honey-combed condition, thereby stretching the vulcanizable material, on the thin films on which the gases act in their nascent condition, to vulcanize the mass, substantially as described.

3. The process of vulcanizing vulcanizable materials by hydrogen sulfid and sulfur dioxide gases produced by injecting powdered sulfur in steam and air suspension in to a closure containing hot vulcanizable material, and subjecting the mass to sustained heat and pressure formed by expanded gases therein, during agitation of the mass, substantially as described.

4. The process of producing a vulcanized cement consisting in introducing in steam suspension in a vat subjected to sustained heat, pressure, and agitation, a mixture of colloidal clay dust, sulfur and hexamythelene-tetramine, and mixing the same in said vat with preheated vulcanizable material, during sustained heat, pressure and agitation of the mass; then subjecting the vat to suction to remove the residual gases, vapors and steam, and to completely dehydrate the mass; then removing the material from the vat, substantially as described.

5. The process of producing an article of manufacture consisting in mixing in a closure a vulcanizable material with vegetable aggregate, then agitating the mass under the influence of heat while injecting therein in steam suspension pulverized sulfur, colloidal mineral dust and vegetable fibers, in a moistened condition; then subjecting the mass to sustained heat to expand the gases and to provide pressure in the closure during mechanical agitation of the mass therein and to vulcanize the same; then subjecting the mass to suction to remove the residual steam gases and vapors from the vat and to completely dehydrate the mass; then removing the mass from the vat, and compressing the same into shape, substantially as described.

6. The process of producing a vulcanized concrete consisting in mixing the residuum of asphaltic base petroleum, coal tar pitch and scrapped vulcanized rubber compounded with vegetable matter, in a vat subjected to sustained heat; then injecting therein in steam and air suspension pulverized sulfur, colloidal mineral dust, and hexamethylene-tetramine, then mixing therewith vegetable fibers in a moist condition, precoated with bitumen, while the same are hot, then closing the vat, and therein subjecting the mass to sustained heat while agitating the same, to vulcanize the mass under pressure caused by the expanding of sulfurous gases therein formed under the influence of heat from the ingredients, then subjecting the vat to suction to dehydrate the mass, and to remove the residual vapors; then removing the mass from the vat and compacting the same to shape, substantially as described.

7. An article of manufacture consisting of fibrous matter colloidally suspended in a mastic composed of vulcanizable materials which have been subjected to the interactions of hydrogen sulfid and sulfur dioxide gases in the presence of moisture, an accelerator of vulcanization and a catalyzer to vulcanize the same suspending colloidal mineral matter and acting as the continuous phase of the product when compacted to shape, substantially as described.

8. An article of manufacture consisting of fibrous matter colloidally suspended in a mastic composed of vulcanizable materials which have been vulcanized by hydrogen sulfid and sulfur dioxide gases simultaneously with their creation in the formative period of the product, and, suspending colloidal matter, acting as the continuous phase separating the fibers in a homogeneous mass, compacted to shape.

9. A vulcanized conglomerate consisting of rubber and asphalt combined and vulcanized by hydrogen sulfid and sulfur dioxide gases, and suspending as the continuous phase, colloidal mineral matter acting as a filler of the aggregate, substantially as described.

In testimony whereof I have hereunto affixed my signature this 7th day of January 1922.

GEORGE A. HENDERSON.